United States Patent Office 3,436,522
Patented Apr. 1, 1969

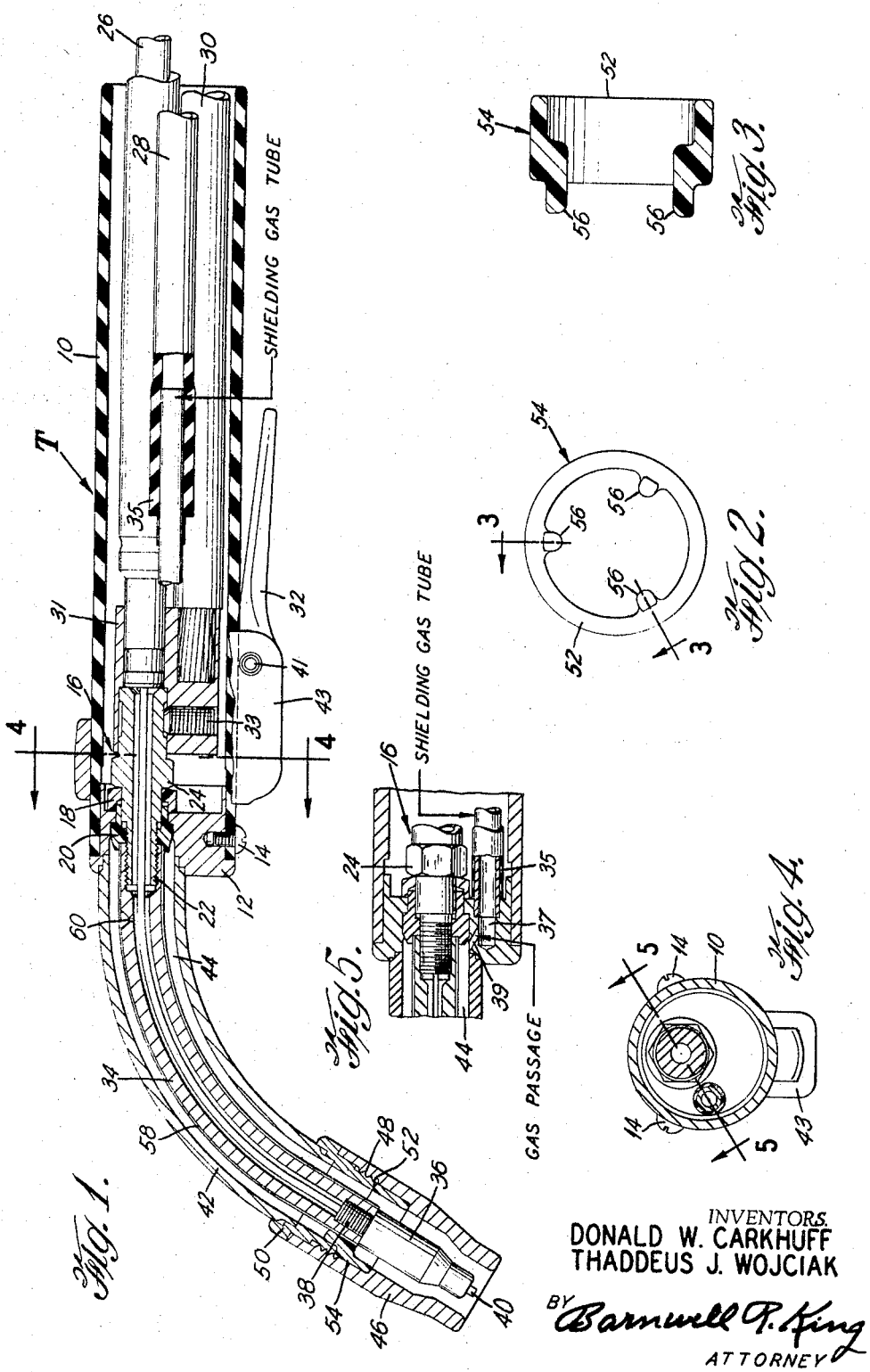

3,436,522
GAS SHIELDED ARC WELDING TORCH
Donald W. Carkhuff, Jamesburg, and Thaddeus J. Wojciak, Clark, N.J., assignors to Union Carbide Corporation, a corporation of New York
Filed Dec. 15, 1964, Ser. No. 418,468
Int. Cl. B23k 9/12, 37/02
U.S. Cl. 219—130                6 Claims

ABSTRACT OF THE DISCLOSURE

An electric arc welding torch for welding with a consumable electrode includes an elongate arc shielding gas expansion chamber having a constant cross-sectional area which is free from obstruction throughout its length. A nozzle is connected to the outer end of the chamber wall and an electrode guide sleeve extends through the chamber. An insulating bushing formed with streemlined rib projections fits into a recess in the nozzle such that the ribs extend into the gas chamber to position the guide tube in a spaced concentric relationship with the chamber wall and to provide for a streamlined flow of gas through the chamber to the workpiece.

---

This invention relates to consumable electrode arc welding and more particularly to gas shielded arc torches.

The invention provides a novel torch comprising an electrode wire guide tube having a tubular electrical contact tip at the outlet end thereof, and a tubular electrically isolated jacket surrounding said guide tube in spaced relation to provide a baffle-free elongate arc shielding gas expansion chamber of substantially constant cross sectional area from one end to the other. The jacket and tube are connected in concentric relation at the rear ends thereof by supporting means having a gas inlet to such chamber. A nozzle is connected to the outer end of said jacket having an internal annular recess surrounding the front end of said tube in concentric relation. The nozzle surrounds the contact tip in spaced concentric relation to provide an annular gas exit passage. A centering bushing composed of insulating material has an annular wall fitting into such recess, and also at least three laterally spaced ribs projecting into the outlet end of such expansion gas chamber to hold the front ends of the tube and jacket in critically spaced concentric relation. The ribs are relatively slender, having rounded ends and smooth streamlined surfaces, providing for the free streamline flow of gas therebetween from such chamber through the bushing and the annular passage between the contact tip and the nozzle. The internal diameter of the inner wall of the jacket is substantially constant throughout its length, and the diameter of the inner surface of the wall of the bushing is similarly constant and equal to that of the jacket. The curved, streamlined sides of the ribs cause minimum disruption in gas flow while accomplishing the critical centering of the tube within the jacket at the front ends thereof.

This construction is important, since gas streams flowing around curved tubes normally tend to become dissociated and turbulent, thereby providing poor gas shielding. The present invention results in a laminar coherent gas stream, providing exceptionally good shielding of the arc welding operation.

The bushing extends past the contact tip to provide maximum arc-over protection between the nozzle and the contact tip. Furthermore, the electrode guide tube is provided with a porous sleeve of insulating material that covers the tube throughout its length, the tube having a gas bleed hole located under the sleeve to insure against leakage of air around the electrode therein.

In the drawings:
FIG. 1 is a fragmentary view mainly in longitudinal cross section of a torch illustraing the invention;
FIG. 2 is an enlarged end view of the bushing;
FIG. 3 is a sectional view of the bushing taken on lines 3—3 of FIG. 2;
FIG. 4 is a view mainly in cross section taken on lines 4—4 of FIG. 1; and
FIG. 5 is a fragmentary view in cross section taken on lines 5—5 of FIG. 4.

As shown in FIG. 1, torch T comprises a tubular handle 10 composed of nonconducting material, in the front end of which is mounted a body 12 that is secured by screws 14. A hollow connection 16 extends through a corresponding hole in the body 12 and is held in place by annular clamping members 18 and 20 composed of insulating material, the latter being threaded to the front portion 22 of the connector 16, and the former being abutted by a hexagonal flange 24 on the connector. Service lines 26, 28, and 30, for the electrode wire, arc shielding gas, and electric welding current, respectively, extend into the handle 10. The electrode wire line 26 is connected to the connection 16 by a block 31 which is secured to the connection 16 by a set screw 33. The welding current line 30 in the form of stranded cable is also connected to the block 31, as shown. Gas line 28 comprises a tubular rubber hose the end of which fits a gas inlet tube 35 that is connected to the body 12. The latter has a gas inlet passage 37 leading to a relatively short inclined gas inlet port 39 at the rear end of the chamber 44.

A control lever 32 is pivoted at 41 to a switch housing 43 mounted on the handle 10. The control lever, when actuated, switches on the welding current, arc shielding gas, and electrode wire feed.

The inner end of a curved electrode wire guide tube 34 is also threaded to the front portion 22 of the connector 16. An electrical contact tip 36 is connected by threads 38 to the outer end of the tube 34 for conducting welding current to the consumable electrode 40 in the form of wire, as the latter passes therethrough in use.

A tubular electrically isolated jacket 42 surrounds the tube 34 in spaced concentric relation to provide a curved, elongated, baffle-free shielding gas expansion chamber 44 between the tube and jacket. The rear end of the jacket is silver soldered to the body 12 in concentric relation to the longitudinal axis of connector 16. Nozzle 46 is connected to the front or outer end of the jacket 42 by threads 48, and is provided wtih an internal annular recess 50 surrounding the front end of tube 34 in spaced concentric relation to contact tip 36. Ftting into such recess 50 is the annular wall 52 of a bushing 54 that is composed of electrically insulating material, such as glass-reinforced plastic. The bushing is provided with at least three equally spaced slender ribs 56, projecting into the outlet or front end of the expansion chamber 44 to hold the front ends of the curved tube 34 and jacket 42 in spaced substantially exactly concentric relation to each other.

The wire guide tube 34 is covered with a porous sleeve 58 extending throughout its length, composed of braided fiberglass, and is cemented at its ends to the tube 34. This provides for electrically insulating the jacket 42, preventing accidental arc-over, and allows the bleed-flow to the electrode passage of arc shielding gas through hole 60 in the tube 34, preventing objectionable aspiration of air therein.

Arc shielding gas such as argon, $CO_2$, or any other suitable arc shielding gas or mixtures thereof, enters the curved tubular gas expansion chamber 44 through port 39 that is relatively small. The shielding gas flows through the expansion chamber and out the bushing with a maximum amount of stability by virtue of the fact that the annular passage (cross-sectional area of the chamber) is substantially constant from one end to the other of the chamber. The bushing keeps the wire guide tube 34 concentric with the jacket 42, and the ribs 56 that project into the gas stream permit the gas to flow through the spaces between them in a coherent streamline-manner without creating any turbulence.

Insulated centering between the electrically hot wire guide and the curved jacket is thus accomplished by the slender ribs which allow the gas to flow past such ribs without creating any turbulence or disrupting the streamline flow. This construction results in excellent arc gas-shielding characteristics. The torch, even when the elongated annular gas passage curves as in the illustrated example, provides a rugged all-metal front end part that is electrically insulated from the electrical current carrying inner members, and increases the heat radiating surface that is desirable for good air-cooling.

What is claimed is:

1. A consumable electrode arc welding torch comprising
  a wire guide tube having a contact tip at the front end thereof,
  a porous sleeve of insulating material covering the tube throughout its length, and said tube is provided with an arc shielding gas bleed hole located under said sleeve,
  a jacket having a nozzle at the front end thereof,
  means electrically isolating said tube and jacket,
  said tube and jacket being arranged in spaced concentric relation to provide an elongated arc shielding gas expansion chamber of substantially constant cross-sectional area from one end to the other end of the chamber to provide for coherent flow of arc shielding gas toward the front end thereof, and
  means acting to center the front end of said tube within the front end of said jacket comprising slender ribs having smooth streamlined surfaces, said ribs being spaced from one another to leave open passages for the flow of gas, so that the coherent nature of the gas flow is reestablished as the gas flows into the nozzle.

2. A consumable electrode gas shielded arc torch comprising, in combination, an electrode wire guide tube having a tubular electrical contact tip at the outlet end thereof, a tubular electrically isolated jacket surrounding said guide tube in spaced concentric relation to provide an elongated arc shield gas expansion chamber, supporting means connecting said jacket and tube in concentric relation at the rear ends thereof having a gas inlet to such chamber, a nozzle connected to the outer end of said jacket having an internal annular recess surrounding the front end of said tube in concentric relation, said nozzle surrounding said contact tip in spaced concentric relation to provide an annular gas passage, and a bushing composed of insulating material having an annular wall fitting into such recess and having also at least three longitudinally spaced slender ribs projecting into the outlet end of such expansion gas chamber to hold the front ends of said tube and jacket in spaced substantially exactly concentric relation, said slender ribs having rounded ends, providing for the free streamline flow of gas from such chamber through the bushing and the annular passage between said contact tip and the nozzle.

3. A torch as defined by claim 2, in which the tube and jacket are concentric with a common arcuate central axis that subtends an arc of less than 90 degrees between the gas inlet and outlet of such gas expansion chamber.

4. A torch as defined by claim 3, in which only one gas inlet that is a relatively small port is used in combination with the curved elongated gas expansion chamber, resulting in coherent streaming of the gas as it enters the bushing by virtue of the unobstructed flow of the gas through such chamber.

5. A torch as defined by claim 4, in which the tube is covered with a flexible sleeve of fiber glass that electrically insulates the surface of such tube.

6. A torch as defined by claim 5, in which the tube is provided with a gas bleed-hole under such sleeve, for slightly pressurizing the interior of the tube with arc shielding gas.

References Cited
UNITED STATES PATENTS

| | | | |
|---|---|---|---|
| 3,048,691 | 8/1962 | Longstreth | 219—130 |
| 3,121,784 | 2/1964 | McGinty et al. | 219—75 |
| 3,230,343 | 1/1966 | Nagy | 219—130 |
| 2,544,711 | 3/1951 | Mikhalapou. | |
| 2,929,912 | 3/1960 | Lesnewich. | |

RICHARD M. WOOD, *Primary Examiner.*

J. GREGORY SMITH, *Assistant Examiner.*

U.S. Cl. X.R.

219—74, 136